United States Patent
Raph

(10) Patent No.: US 7,020,572 B2
(45) Date of Patent: Mar. 28, 2006

(54) METHOD FOR RECEIVING AND ASSOCIATING CONDITIONAL DEPENDENT TEST RESULTS

(75) Inventor: Darvin Dale Raph, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 6 days.

(21) Appl. No.: 10/917,592

(22) Filed: Aug. 13, 2004

(65) Prior Publication Data
US 2006/0036393 A1 Feb. 16, 2006

(51) Int. Cl.
*G06F 11/00* (2006.01)
(52) U.S. Cl. .................. 702/120; 702/127; 702/117
(58) Field of Classification Search ........... 702/120, 702/57–59, 67, 68, 117, 118, 129, 127, 180, 702/187, 179; 715/965, 970, 961, 967, 771, 715/700
See application file for complete search history.

(56) References Cited

U.S. PATENT DOCUMENTS

| | | | | |
|---|---|---|---|---|
| 5,144,229 A | * | 9/1992 | Johnsrud et al. | 714/734 |
| 6,570,592 B1 | * | 5/2003 | Sajdak et al. | 715/769 |
| 6,757,632 B1 | * | 6/2004 | Tuttobene et al. | 702/117 |
| 2001/0026949 A1 | * | 10/2001 | Ogawa et al. | 438/15 |

* cited by examiner

*Primary Examiner*—Hal Wachsman

(57) ABSTRACT

Methods for collecting and displaying conditional dependent test results. At least one measurement condition is received. The received measurement condition specifies the measurement environment. A result is received from at least one measurement. For each received result, each received measurement condition is associated with the received result, a new row in a table is selected, the received result is recorded in a specified result column in the new row, a separate column is associated with each received measurement condition, and each associated received measurement condition is recorded in its associated column in the new row. A change to the measurement environment is received, wherein the change includes at least one of the following: (1) a modification of at least one measurement condition, (2) an omission of at least one measurement condition, and (3) the addition of at least one new measurement condition. Appropriate steps are then repeated.

14 Claims, 7 Drawing Sheets

| Time | Measurement Made | Measurement Value | Status | Min | Max | At Frequency | V(in) | I(in) |
|---|---|---|---|---|---|---|---|---|
| 15:55.31 | Leakage Current | 0.05 micro Amp | Fail | 0 | 0.01 | 0 MHz | 5.0 Volts | |
| 16:05.45 | Current Gain | 6.5 | Pass | 6.0 | 7.0 | 100 MHz | | 1 mA |
| 16:06.22 | Current Gain | 4.2 | Pass | 4.0 | 5.9 | 150 MHz | | 1 mA |
| 16:07.05 | Output Power | 2.31 mW | Pass | 2.0 | 2.8 | 200 MHz | 100 mV | |
| 16:08.72 | Output Power | 2.29 mW | Pass | 2.0 | 2.8 | 200 MHz | 100 mV | |
| 16:09.99 | Output Power | 2.05 mW | Pass | 2.0 | 2.8 | 200 MHz | 100 mV | |
| 16:11.34 | Output Power | 1.55 mW | Fail | 2.0 | 2.8 | 200 MHz | 100 mV | |

FIG. 3

| Time | Measurement Made | Measurement Value | At Frequency | I(in) | Min | Max | Status |
|---|---|---|---|---|---|---|---|
| 16:06.22 | Current Gain | 4.2 | 100 MHz | 1 mA | 6.0 | 7.0 | Pass |
| 16:05.45 | Current Gain | 6.5 | 150 MHz | 1 mA | 4.0 | 5.9 | Pass |

*FIG. 4*

| Time | Measurement Made | Measurement Value | At Frequency | V(in) |
|---|---|---|---|---|
| 16:07.05 | Output Power | 2.31 mW | 200 MHz | 100 mV |
| 16:08.72 | Output Power | 2.29 mW | 200 MHz | 100 mV |
| 16:09.99 | Output Power | 2.05 mW | 200 MHz | 100 mV |
| 16:11.34 | Output Power | 1.55 mW | 200 MHz | 100 mV |

*FIG. 5*

METHOD FOR RECEIVING AND ASSOCIATING CONDITIONAL DEPENDENT TEST RESULTS

BACKGROUND

The following terms are commonly used in test and measurement systems and will be used herein as defined.

Reporting Name—

A reporting name is a name used to uniquely identify a test or measurement value.

Condition or Measurement Condition—

A condition or measurement condition is a stimuli or set up value that is required to uniquely identify the conditions under which a test or measurement value is obtained. The condition is used to help identify comparable measurement values. For example, a power measurement on a device under test can be dependent upon the frequency of the measurement. In a pass-fail test, the specification for a system at 100 MHz can be significantly different from that at 150 MHz. In this case, aggregation of the power measurement for statistical analysis should only occur at an equivalent frequency. Often such information is encoded into the reporting name, e.g., "Power@200 Mhz".

Publisher—

A publisher is a piece of code that originally acquires information about the device under test and provides it to other storage and/or analysis programs via a text file or data base entry.

Test Program—

A test program is any piece of code written in any language whose purpose is to collect information about a device under test (DUT) by stimulating the device under test and measuring outputs or reactions of the device under test.

Test Plan—

A test plan is the information that a test executive uses to direct the testing of a device under test. This is the data driven alternative to writing a test program. Test executives typically provide for more structure and less flexibility while improving consistency and re-usability of testing algorithms. Examples include TestExecSL from Agilent Technologies and TestStand from National Instruments (TestExecSL is a trademark of Agilent Technologies and TestStand is a trademark of National Instruments Corporation).

Results Subscriber—

A results subscriber is a piece of program code that receives published records and transforms them into the style and format desired by the user or test organization. Subscribers are also referred to as listeners.

Previous data logging techniques often require that the publisher of the data, usually a test and measurement program or test executive, decide on the record format and its structure at the time the measurement is taken. Interactive graphical presentations are controlled directly from the publishing program as well. The knowledge required to publish the data leads to less reusable and more complex tests or measurement code. Existing alternatives to this up-front association require a post processor. However, the post processor becomes just as complex when handling conditions.

In typical test programs, the publisher decides what information is to be collected and how to organize it effectively. Condition information is often encoded into the reporting name. A "Power" measurement will encode the condition. For example, "Power@150 MHz" and "Power@200 MHz" will be logged with the separate names. In this way, two unlike power measurements are uniquely named and, therefore, separable for statistical analysis purposes. A histogram combining the two power measurements would be of little use since the expected values are different for each unique condition. Encoding the condition in the name requires that the publisher of the data have access to the condition information when the measurement value is published. This creates problems in many test and measurement programs.

The condition may have been set up earlier in the program and applied for several tests or measurements. Factoring out common stimuli improves performance of the program (or test plan in a test executive). However, if the test is still required to store this setup information in the reporting name, it must be passed into the test. This increases the complexity of the test and measurements. The test must have knowledge of the kind and format of the stimuli information. The stimuli information may be passed in as extra parameter or some external data passing scheme. The stimuli information, however, is not used in the measurement except for the purpose of data logging. The test or measurement then becomes no longer highly re-usable, as the stimuli information is now strongly coupled to the test or measurement. Changes to the number and type of conditions now require changes to the measurement or test.

The stimuli data which is passed into a test is called driving data. Holding driving data in an array or table is an improvement to encoding the condition in the name. The measurement values are combined with the data in the driving data table as it is published. A given test organization can then change the values of the driving data dynamically according to changing needs. However, changes are limited in scope and a coupling still exists with the test or measurement since the test must fill up the driving data table with measurement values and publish it.

Another solution is to let outer loops of the test program or test plan publish the conditions as they occur. The tests or measurements that follow are now independent of the condition. The nested test now has no knowledge of the condition or of its existence. The same test or measurement can be reused in another loop or part of the test program with no modification required. The number and kind of conditions can be modified with no changes to the measurement or test. The stimuli data can be changed based on the changing needs of the testing organization.

However, the association of the test and measurement with the condition must be made at some later point in time. This creates significant set of new problems. Some kind of post-processing program or algorithm is needed to re-associate the conditions with the measurements. While some test systems include a post processor, the job of association becomes complex quickly and is rarely done. For example, the organization may stuff the data into a relational database and use time stamps to associate the conditions with the measurements. Using SQL, the data base expert can extract only those measurements with common conditions. However, the queries on the database become complex. Often, the writer of those queries needs detailed knowledge of the test program that generated the results to make the association. Once the proper association is made, the data resulting from those queries are then analyzed statistically and, optionally, presented graphically. This process is time consuming and does not allow for quick interactive graphical displays of the data as it is being collected.

SUMMARY

Methods for collecting and displaying conditional dependent test results. At least one measurement condition is received. The received at least one measurement condition specifies the measurement environment. A result is received from at least one measurement. For each received result, each received measurement condition is associated with the received result, a new row in a table is selected, the received result is recorded in a specified result column in the new row, a separate column is associated with each received measurement condition, and each associated received measurement condition is recorded in its associated column in the new row. A change to the measurement environment is received, wherein the change includes at least one of the following: (1) a modification of at least one measurement condition, (2) an omission of at least one measurement condition, and (3) the addition of at least one new measurement condition. The steps above following the step receiving at least one measurement condition are repeated at least one time.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

FIG. 3 is a drawing of a condition and result data table as described in various representative embodiments.

FIG. 4 is a drawing of a displayed part of the condition and result data table as described in various representative embodiments.

FIG. 5 is a drawing of another displayed part of the condition and result data table as described in various representative embodiments.

DETAILED DESCRIPTION

Figure 1:
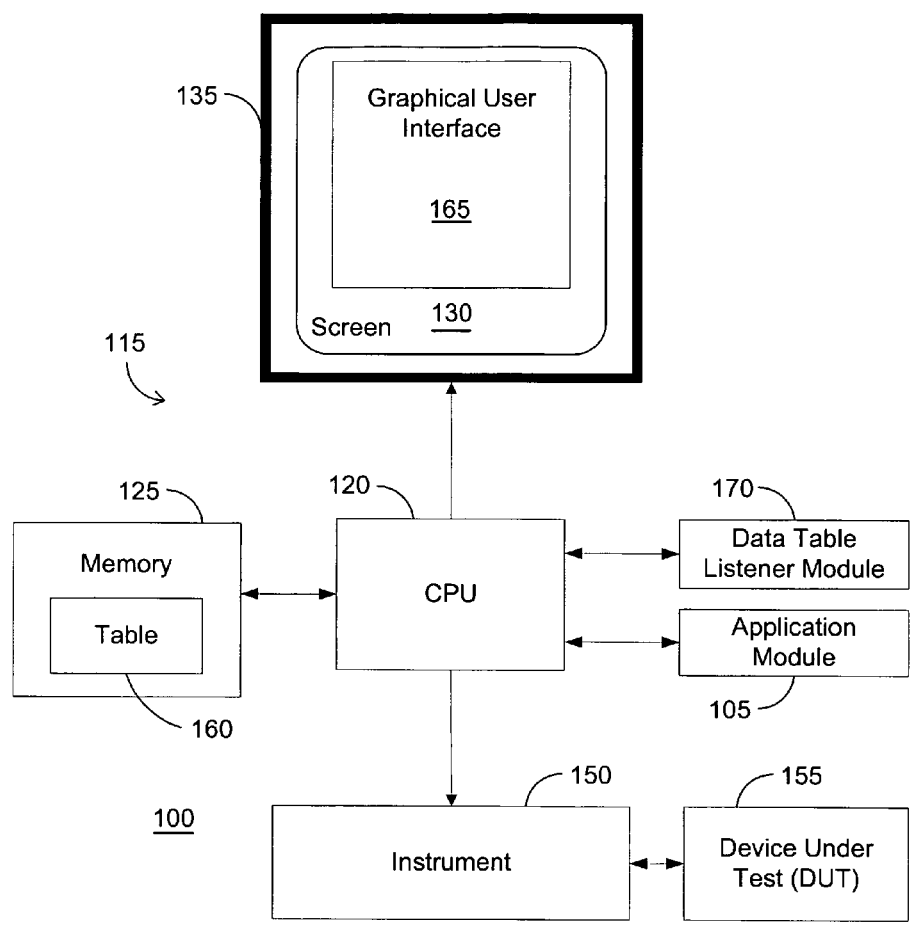
FIG. 1 is a block diagram of a measurement system as described in various representative embodiments.

As shown in the drawings for purposes of illustration, novel techniques are disclosed herein for the rapid association of measurement conditions to measurement test result values. In representative embodiments, the results are aggregated and displayed in a data table. They can be quickly organized by the user and presented graphically with common statistics providing insight into the unit under test. Previous techniques have not been capable of providing such rapid and flexible analysis of test data.

Measurement condition information is collected independently of the measurement data. The condition is recorded along with the start time by publishing a record. This record is similar to XML in that it is hierarchical and extensible. The publisher can add such additional information as the programmer sees fit. Fields are added as information becomes available. Once all of the information is collected, the record is published. A second record is published when the conditions end or change. Conditions are associated with any "start" record. They are considered active until a matching "end" record is published.

As measurement results are collected, they are placed in one or more fields of a measurement record. When complete, the measurement record is published along with a timestamp. Any measurement record published between the "start" and "end" records is considered to be associated with the condition(s) found with the "start" record. A subscriber, also called a listener, is designed to make this association.

One or more subscribers can be registered and configured to listen for published records. Multiple listeners allow traditional data logging solutions to exist in parallel with the interactive data analysis tool described herein.

A special measurement results data table listener can be registered to capture the condition and measurement records. As start records and conditions are published, they are stored in computer memory.

When measurement records are published, the stored information is re-examined. Measurement conditions associated with each measurement can be combined into a single view. A data table is created and populated with the measurements and associated conditions. A row is added to the data table for each measurement.

The measurement value and each of its conditions are held in separate columns in the table. Any measurements published after the conditions end, will have null entries in the data table for those column(s) representing the missing condition. Hence, a sparse data table is created with a row for each measurement. In representative embodiments, a results table viewer implemented as a Microsoft NET control can be provided that allows the user to quickly perform multiple column sorts on the data (Microsoft and .NET are registered trademarks of Microsoft Corporation). The user can quickly bring "like" measurement data together based on common condition values or other attributes. Interesting data can be marked for inclusion in the graphical statistical report. Uninteresting data can be marked for exclusion. This interactive sorting and selection process also enables easy removal of bogus data.

The methods disclosed herein provide for a highly interactive and quick method for selecting results information for analysis. Mean, standard deviation, normality, high and low limits can be presented in one or more graphs. Graphs can include but are not limited to histograms, control charts, and strip charts.

Like data can be quickly analyzed for statistical anomalies. Such anomalies can indicate problems in the device under test (DUT), the measurement algorithm, or the testing process. Insights gained can be used to improve the test algorithm, the testing process or the design of the device under test itself.

Information that can be collected is not restricted to condition information. Other context information such as ambient temperature or the operator running the system may also be recorded. Any information in the table can be examined along with the measurement data.

This means that information other than the measurement value itself can be analyzed by simply clicking on the column header in the table. For example, if the upper limit is calibrated to other measurements of the device under test or the test system, it might be of value to analyze aspects of this situation. Fixed limits would generally be of less interest. In any case, it is only required that the information be displayed as a column in the table for it to be available for analysis.

In the following detailed description and in the several figures of the drawings, like elements are identified with like reference numerals.

FIG. 1 is a block diagram of a measurement system 100 as described in various representative embodiments. In FIG. 1, a computer 115 comprises a central processing unit (CPU) 120, a memory 125, and a monitor 135. In a representative embodiment of a test configuration, an application 105, also referred to herein as an application module 105, operating on the computer 115 communicates with an instrument 150 which performs measurements on a device under test (DUT) 155 under defined measurement conditions. These conditions and measurement results are collected by a data table listener module 170, also referred to herein as data table listener 170, and then stored in a table 160, also referred to herein as condition and result data table 160, stored in the memory 125. Selected portions of the table can be displayed via a graphical user interface 165 on a screen 130 of the monitor 135.

Figure 2:
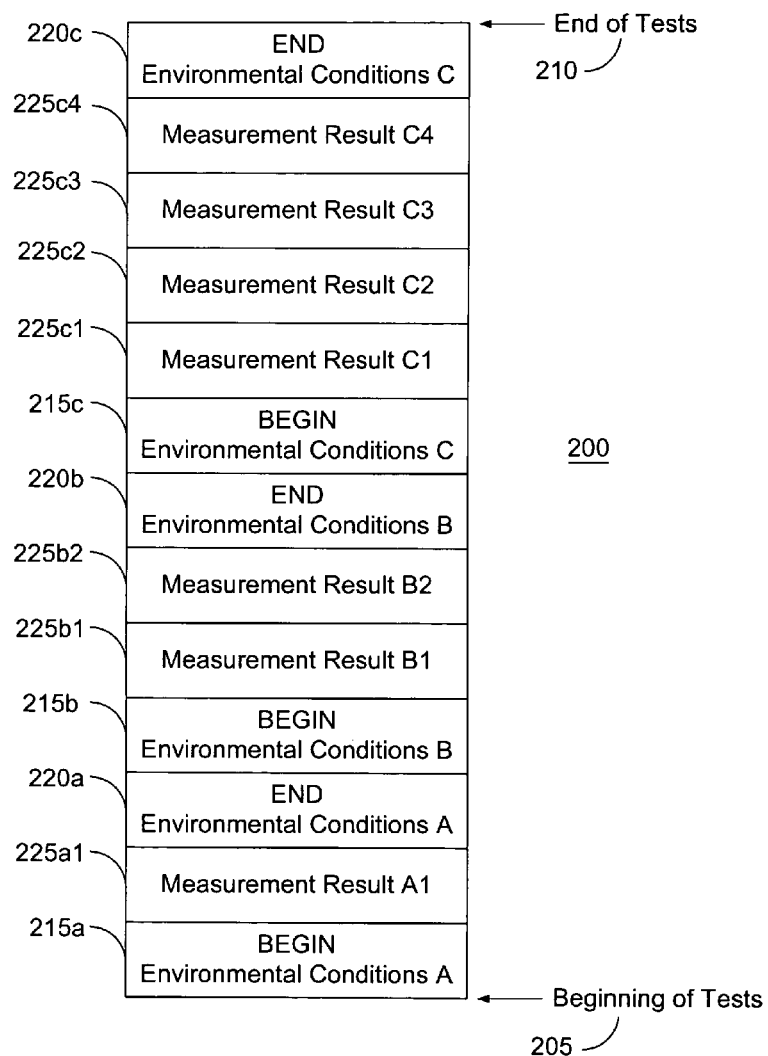
FIG. 2 is a block diagram of a condition and result data reception time line as described in various representative embodiments.

FIG. 2 is a block diagram of a condition and result data reception time line 200 as described in various representative embodiments. At the beginning of tests 205, a message indicating the beginning of validity of first measurement conditions 215a with a record comprising first measurement conditions 215a under which measurements will be taken is received by the data table listener 170. This message is indicated in FIG. 2 as BEGIN Environment Conditions A 215a. Then a record comprising measurement result A1 225a1 is received. First measurement conditions 215a are assumed to be valid until a message indicating the end of the validity of those conditions. A message indicating the end of validity of first measurement conditions 215a is next received. This message is indicated in FIG. 2 as END Environment Conditions A 220a.

Next in the representative example of FIG. 2, a message indicating the beginning of validity of second measurement conditions 215b with a record comprising second measurement conditions 215b under which measurements will be taken is received by the data table listener 170. This message is indicated in FIG. 2 as BEGIN Environment Conditions B 215b. Then a record comprising measurement result B1 225b1 is received followed by the reception of measurement result B2 225b2. Second measurement conditions 215b are assumed to be valid for both measurement result B 1 225b1 and measurement result B2 225b2. A message indicating the end of validity of second measurement conditions 215b is next received. This message is indicated in FIG. 2 as END Environment Conditions B 220b.

Next in the representative example of FIG. 2, a message indicating the beginning of validity of third measurement conditions 215c with a record comprising third measurement conditions 215c under which measurements will be taken is received by the data table listener 170. This message is indicated in FIG. 2 as BEGIN Environment Conditions C 215c. Then a record comprising measurement result C1 225c1 is received followed by the reception of measurement result C2 225c2. Then a record comprising measurement result C3 225c3 is received followed by the reception of measurement result C4 225c4. Third measurement conditions 215c are assumed to be valid for measurement result C1 225c1, measurement result C2 225c2, measurement result C3 225c3, and measurement result C4 225c4. A message indicating the end of validity of third measurement conditions 215c is next received. This message is indicated in FIG. 2 as END Environment Conditions C 220c. The completion of all tests of interest for this example ends at end of test 210.

In the representative embodiment of FIG. 2, the various measurement conditions 215a,215b,215c, referred to herein generally as measurement conditions 215, are each assumed in effect from their reception until a message indicating their end of validity (e.g., END Environmental Conditions A 220a). Collection and storage of the conditions and measurement results could be effected by various techniques. In one representative embodiment, when an environmental condition is received, it is added to a stack. When a measurement result is received, a row containing that measurement result is added to a data table. The stack comprising the environmental conditions is examined for all the conditions in effect at that time. The environmental conditions in effect at that time are then added to that row of the data table. In another representative embodiment, all measurement results are kept in a time ordered list as they are received in an in-memory cache. Environmental conditions are kept in a separate time ordered list which has some aspects of a stack. A table is not built until a query is received for a particular type of measurement. So, rather than placing the measurement results into a table as they are received, they are placed in a long list of measurement results which are available for querying. In order not to duplicate the conditions for each and every measurement, the measurement results are connected to the environmental conditions valid at the time of the measurement via a pointer to the reception of the environmental conditions. This pointer would effectively point to the top of this pseudo-stack at the time at the time that the measurement was taken. Environmental conditions are not actually removed from this pseudo-stack so that they are available whenever it becomes necessary to construct a table from a received query.

FIG. 3 is a drawing of a condition and result data table 160 as described in various representative embodiments. In the representative embodiment of FIG. 3, data is placed into the table 160. The table could comprise a row of column labels 310 which identifies the contents of each column 305 of the table 160. For purposes of illustration only one column 305 is label with its identifying numeral. Each measurement result is entered into the table 160 as a record occupying a data row 315, also referred to herein as a row 315. Again, for purposes of illustration only one data row 315 is label with its identifying numeral. Also, entered into each data row is a time stamp indicating the time that the measurement was taken (in practice typically the time the result was received by the data table listener module 170) and the measurement conditions in effect at the time of the measurement. The result is entered into the column labeled "Measurement Value" which for measurement result A1 225a1 is 0.05 Microamp wherein the optional inclusion of the units of the result is shown. Whereas, the measurement conditions are variously labeled as "Measurement Made" which identifies the type of measurement made which for measurement result A1 225a1 is a leakage current measurement, "Status" which indicates whether or not the device under test passed the test if the test was a pass/fail test, "Min" which indicates the minimum value permitted if the device under test passes, "Max" which indicates the maximum value permitted if the device under test passes, "At Frequency" which indicates the frequency at which the measurement was performed, "V(in)" which indicates the voltage applied to the device under test during the measurement, and "I(in)" which indicates a current applied to the device but which is not a part of the first measurement condition 215*a*.

The next two data rows 315 of the table 160 contain respectively measurement result B1 335*b*1 with the second measurement conditions 215*b* and measurement result B2 335*b*2 again with the second measurement conditions 215*b*. Note that cells in the column labeled "V(in)" are empty as the input voltage is not a condition of this measurement whereas the input current I(in) is and, as such, entries are made in the cells corresponding to I(in).

The bottom four data rows 315 of the table 160 contain respectively measurement result C1 335*c*1 with the third measurement conditions 215*c*, measurement result C2 335*c*2 also with the third measurement conditions 215*c*, measurement result C3 335*c*3 with the third measurement conditions 215*c*, and measurement result C4 335*c*2 with the third measurement conditions 215*c*. For these measurements, note that cells in the column labeled "I(in)" are empty as the input current is not a condition of this measurement whereas the input voltage V(in) is and, as such, entries are made in the cells corresponding to V(in).

Once sufficient data has been collected into the table 160, the user can display a part of the table 160 on the graphical user interface 165 of the monitor's 135 screen 130. The user accomplishes this selection by interactively hiding selected columns 305 and rows 315. After a selected part of the table 160 is displayed, the user can choose to hide additional columns 305 and/or rows 315. The user can also choose to uncover some or all of the hidden columns 305 and rows 315 as the user believes appropriate. The user is also free to reorder columns 305 and to perform a sorting of rows 315 based, for example, on the value of the contents of one or more column 305 cells. Such reordering is again performed as the user feels appropriate for the current purpose. Various analysis methods can be performed interactively by the user on various parts of the displayed or, for that matter, non-displayed data of the table 160. The user can choose to analyze measured results and/or measurement conditions. As an example, the user determine the percentage of devices that pass a particular test at one frequency vs. the percentage of the devices that pass the same test at another frequency.

FIG. 4 is a drawing of a displayed part of the condition and result data table 160 as described in various representative embodiments. In the representative embodiment of FIG. 4, the two data rows 315 shown are recreations of part of the data records in the full condition and result data table 160 are for measurement result B1 225*b*1 with second measurement conditions 215*b* and for measurement result B2 225*b*2 with second measurement conditions 215*b*. For FIG. 4, the user has chosen to display only those measurement records that measure current gain, to further limit the display of columns 305 to those having data, to reorder the columns 305 viewed, and to sort the rows 315 in ascending order based on the value in the "Measurement Value" for each row 315.

FIG. 5 is a drawing of another displayed part of the condition and result data table 160 as described in various representative embodiments. In the representative embodiment of FIG. 5, the four data rows 315 shown are recreations of part of the data records in the full condition and result data table 160 are for measurement result C1 225*c*1 with third measurement conditions 215*c*, for measurement result C2 225*c*2 with third measurement conditions 215*c*, for measurement result C3 225*c*3 with third measurement conditions 215*c*, and for measurement result C4 225*c*4 with third measurement conditions 215*c*. For FIG. 5, the user has chosen to display only those measurement records that measure output power, to further limit the display of columns 305 to those the user believes are necessary for analysis, and to reorder the columns 305 viewed. A sort on the rows 315 has not been performed. However, the values entered in the "Measurement Value" cells is observed to be in descending order which might occur if the device under test is over stressed between measurements. The various measurement results A1 . . . C4 225*a* . . . 225*c*4 are referred to generally as measurement results 225.

Figure 6:
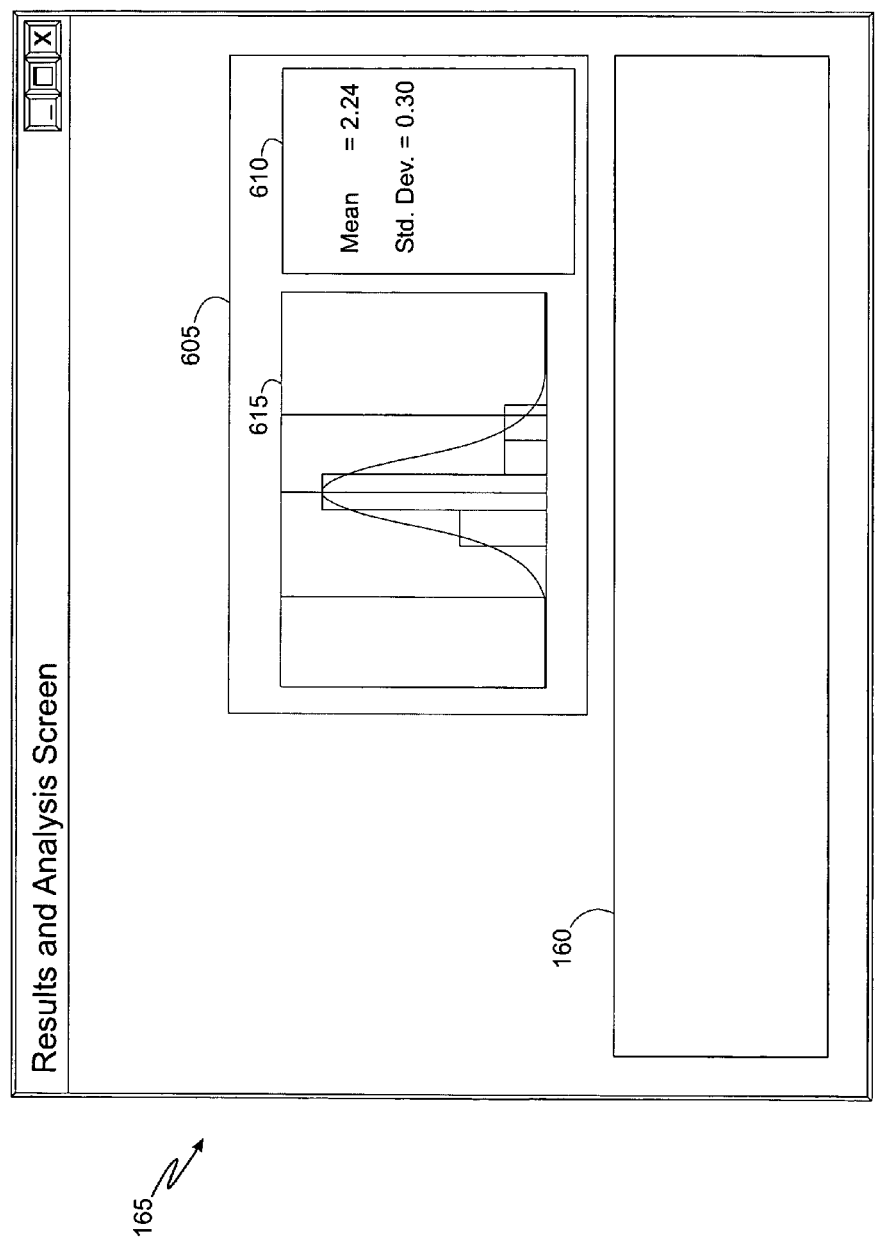
FIG. 6 is a drawing of a graphical user interface as described in various representative embodiments.

FIG. 6 is a drawing of a graphical user interface 165 as described in various representative embodiments. In FIG. 6, at least a part of the condition and result data table 160 is displayed on the graphical user interface 165. The user can use this view or another designed as a utility for selecting which columns 305 and which rows 315 to display. A computer mouse can be used as a means for hiding, uncovering, ordering, and sorting the columns 305 and rows 315 as appropriate. The common drag and drop technique can be used to reorder columns and a dialog box can be used to select a sort by left clicking on a column 305 and right clicking to display the dialog box with options to sort and to sort either ascending or descending. Also shown in FIG. 6 is an analysis window 605 within which the results of various analysis procedures can be displayed in a text data analysis area 610 and/or a graphical data analysis area 615. Various techniques can be employed to activate any of various analytical procedures. These techniques include dialog boxes and the use of the mouse to select a particular technique. Standard analysis methods include the computation of means, standard deviations, normality, high and low limits, and the like. Such numbers can be displayed as text or can be presented in one or more graphs. Graphs can include but are not limited to histograms, control charts, and strip charts.

In FIG. 6 is an example of a histogram. As well as a conventional histogram of all measured values, the histogram could be performed on the lower limit of a test. This is possible if the publisher of the test program chooses to add limit information to the measurement record using extensible fields. Extensibility is not limited to the data being collected. Adding new graphs can extend the analytical power of the measurement system. A Microsoft .NET base "user control" can be provided for programmers to create their own custom graphs and reports.

A data table listener integrates all of fields of the extendable measurement with the start and end records which contain the measurement conditions. Since the start and end records can contain multiple conditions and other context information, the results table listener extends the table 160 by adding columns 305 automatically. The data is held in separate but manageable columns 305. Standard Microsoft NET data table columns 305 are not hierarchical. However, the columns 305 in the results table 160 accurately represent the arbitrary hierarchy of the fields found in the results records. Columns 305 can be expanded and collapsed. A single column 305 can be expanded into one or more detailed columns 305. Most columns 305 can be collapsed into a single summary column 305 by simply clicking on a button or other convenient technique. Uninteresting columns 305 can be hidden and remain hidden by the user—again, by simply clicking on a button.

Since a standard Microsoft .NET data table 160 has strongly typed columns 305, a given column 305 is normally allowed to hold a single kind of data. The results table 160 can relax this restriction by adding a custom aggregating data type. Results table columns 305 support all of the data types represented in the results record field hierarchy. Using Microsoft NET type converters, it can easily change column values into commonly used programming data types. For example, a graph needing floating-point numbers requests that the column 305 provide its values as doubles. This flexible type conversion allows for most statistical analysis to be performed on summary data as well as the more detailed columns 305.

The combination of the automatic association of condition information, automatic type conversion, sorting, row selection and hiding of columns 305 can create a powerful tool for analyzing test results without the use of SQL or other traditional relational database query techniques.

In representative embodiments, the disclosed methods provides the user with an extendable point and click analysis tool that adds insight into the information collected by automated test and measurement systems.

Figure 7:
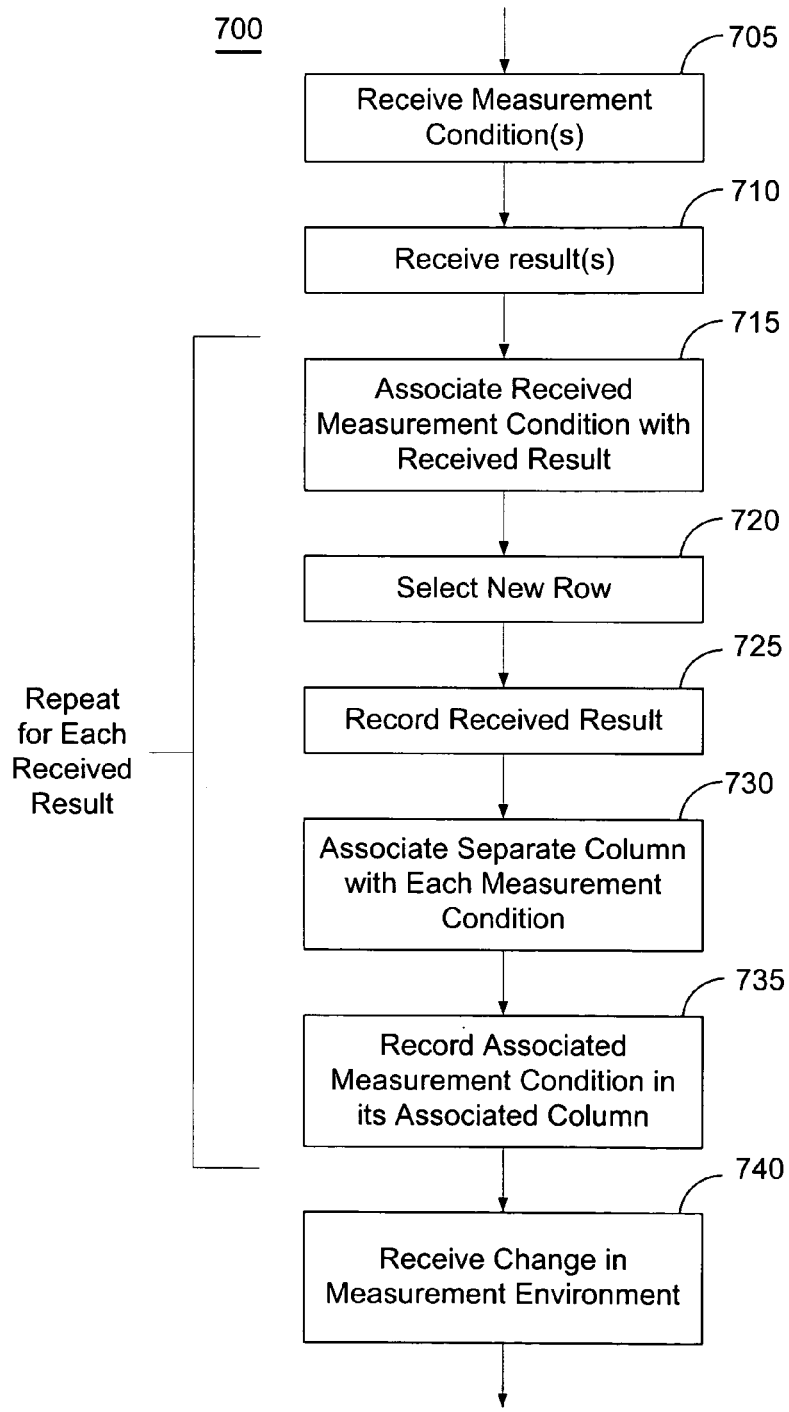
FIG. 7 is a flow chart of a method for collecting and displaying conditional dependent test results as described in various representative embodiments.

FIG. 7 is a flow chart of a method 700 for collecting and displaying conditional dependent test results as described in various representative embodiments. In block 705 of FIG. 7, at least one measurement condition 215 is received. The received at least one measurement condition 215 specifies the measurement environment. Block 705 then transfers control to block 710.

In block 710, a result 225 is received from at least one measurement. Block 710 then transfers control to block 715.

Blocks 715–735 are repeated for each received measurement result 225. In block 715 each received measurement condition 215 is associated with the received result 225. Block 715 then transfers control to block 720.

In block 720, a new row 315 in the table 160 is selected. Block 720 then transfers control to block 725.

In block 725, the received result 225 is recorded in a specified result column 305 in the new row 315. Block 725 then transfers control to block 730.

In block 730, a separate column 305 is associated with each received measurement condition 215. Block 730 then transfers control to block 735.

In block 735, each associated received measurement condition 215 is recorded in its associated column 305 in the new row 315. Block 735 then transfers control to block 740.

In block 740, a change to the measurement environment is received. This change comprises at least one of the following: (1) modification of at least one measurement condition 215, (2) omission of at least one measurement condition 215, and (3) addition of at least one new measurement condition 215.

The steps above which follow the step receiving at least one measurement condition (i.e., all blocks after block 705) are repeated at least one time before the process is exited after block 740.

As is the case, in many data-processing products, the systems described above may be implemented as a combination of hardware and software components. Moreover, the functionality required for use of the representative embodiments may be embodied in computer-readable media (such as floppy disks, conventional hard disks, DVD's, CD-ROM's, Flash ROM's, nonvolatile ROM, and RAM) to be used in programming an information-processing apparatus (e.g., the computer 115 comprising the elements shown in FIG. 1 among others) to perform in accordance with the techniques so described.

The term "program storage medium" is broadly defined herein to include any kind of computer memory such as, but not limited to, floppy disks, conventional hard disks, DVD's, CD-ROM's, Flash ROM's, nonvolatile ROM, and RAM.

The computer 115 can be capable of running one or more of any commercially available operating system such as DOS, various versions of Microsoft Windows (Windows 95, 98, Me, 2000, NT, XP, or the like), Apple's MAC OS X, UNIX, Linux, or other suitable operating system.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for receiving and associating conditional dependent test results, comprising:
   receiving at least one measurement condition, wherein the received at least one measurement condition specifies a measurement environment;
   receiving a result from at least one measurement;
   for each received result,
      associating each received measurement condition with the received result,
      selecting a row in a table;
      recording the received result in a specified result column in the selected row,
      associating a separate column in the table with each received measurement condition, and
      recording each associated received measurement condition in the separate column associated with that received measurement condition in the selected row;
   receiving a change to the measurement environment, wherein the change comprises at least one of the following:
      modification of at least one measurement condition,
      omission of at least one measurement condition, and
      addition of at least one new measurement condition;
   repeating at least one time the steps above following the step receiving at least one measurement condition;
   displaying at least part of the table via a graphical user interface; and
   modifying the displayed at least part of the table by hiding and uncovering selected columns and rows, reordering columns, and sorting rows.

2. The method as recited as in claim 1, wherein the step modifying the displayed at least part of the table comprises sorting rows by reordering the rows based on content of at least one column in each row.

3. The method as recited as in claim 1, wherein the step modifying the displayed at least part of the table comprises reordering the columns based on content type of at least one column.

4. The method as recited as in claim 1, wherein column labels are displayed on the graphical user interface for each displayed column of the table.

5. The method as recited as in claim 1, further comprising:
   performing a standard analysis method on remaining displayed data, wherein the standard analysis method is selected from the group consisting of computing a mean, computing a standard deviation, computing a minimum, computing a maximum, computing a median, computing normality, and plotting a histogram.

6. The method as recited as in claim 5, wherein the results of performing the standard analysis method are displayed in graphic form on the graphical user interface.

7. The method as recited as in claim 5, wherein the results of performing the standard analysis method are displayed as text on the graphical user interface.

8. A computer readable memory device embodying a computer program of instructions executable by a computer, the instructions comprising:
   receiving at least one measurement condition, wherein the received at least one measurement condition specifies a measurement environment;
   receiving a result from at least one measurement;
   for each received result,
      associating each received measurement condition with the received result,
      selecting a row in a table;
      recording the received result in a specified result column in the selected row,
      associating a separate column in the table with each received measurement condition, and
      recording each associated received measurement condition in the separate column associated with that received measurement condition in the selected row;
   receiving a change to the measurement environment, wherein the change comprises at least one of the following:
      modification of at least one measurement condition,
      omission of at least one measurement condition, and
      addition of at least one new measurement condition;
   repeating at least one time the steps above following the step receiving at least one measurement condition;
   displaying at least part of the table via a graphical user interface; and
   modifying the displayed at least part of the table by hiding and uncovering selected columns and rows, reordering columns, and sorting rows.

9. The computer readable memory device as recited as in claim 8, wherein the step modifying the displayed at least part of the table comprises sorting rows by reordering the rows based on content of at least one column in each row.

10. The computer readable memory device as recited as in claim 8, wherein the step modifying the displayed at least part of the table comprises reordering the columns based on content type of at least one column.

11. The computer readable memory device as recited as in claim 8, wherein column labels are displayed on the graphical user interface for each displayed column of the table.

12. The computer readable memory device as recited as in claim 8, further comprising:
   performing a standard analysis method on remaining displayed data, wherein the standard analysis method is selected from the group consisting of computing a mean, computing a standard deviation, computing a minimum, computing a maximum, computing a median, computing normality, and plotting a histogram.

13. The computer readable memory device as recited as in claim 12, wherein the results of performing the standard analysis method are displayed in graphic form on the graphical user interface.

14. The computer readable memory device as recited as in claim 12, wherein the results of performing the standard analysis method are displayed as text on the graphical user interface.

* * * * *